(12) United States Patent
Nadel et al.

(10) Patent No.: US 12,203,499 B1
(45) Date of Patent: Jan. 21, 2025

(54) FASTENING SYSTEM, A FASTENER ASSEMBLY, AND A METHOD OF PRELOADING THE FASTENER ASSEMBLY

(71) Applicant: The Boeing Company, Arlington, VA (US)

(72) Inventors: Adam Ian Nadel, Vienna, VA (US); Kjersta Lynn Larson-Smith, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/537,286

(22) Filed: Dec. 12, 2023

(51) Int. Cl.
*F16B 31/02* (2006.01)

(52) U.S. Cl.
CPC ........ *F16B 31/028* (2013.01); *F16B 2200/95* (2023.08)

(58) Field of Classification Search
CPC ........................ F16B 31/028; F16B 2200/95
See application file for complete search history.

(56) References Cited

U.S. PATENT DOCUMENTS

| | | | | |
|---|---|---|---|---|
| 3,495,907 A * | 2/1970 | Rogers | ..................... | G01L 1/241 73/761 |
| 4,131,050 A * | 12/1978 | Holmes | ................. | F16B 31/028 411/10 |
| 4,164,164 A * | 8/1979 | Trungold | .............. | F16B 31/028 411/10 |
| 4,773,272 A * | 9/1988 | Trungold | ................ | G01L 5/243 73/761 |
| 5,385,054 A * | 1/1995 | Kramer | ................. | F16B 31/028 73/761 |
| 7,156,595 B2 * | 1/2007 | Clarke | .................. | F16B 31/028 411/10 |
| 8,382,409 B2 * | 2/2013 | Wallace | .................. | G01L 5/243 411/13 |
| 2014/0283624 A1 * | 9/2014 | Phipps | .................. | F16B 31/028 73/862.381 |

\* cited by examiner

*Primary Examiner* — Bayan Salone
(74) *Attorney, Agent, or Firm* — Yee & Associates, P.C.

(57) ABSTRACT

A fastening system includes a first component and a second component. The fastening system includes a fastener assembly configured to attach together the first component and the second component. The fastening system also includes a layer disposed between the fastener assembly and the first component and/or the second component. The layer is configured to provide an alert when a predetermined compressive load has been reached in the first component and the second component which signals that a preload of the fastener assembly has been reached. A method of preloading a fastener assembly includes applying a torque to the fastener assembly until a predetermined compressive load has been reached in the first component and the second component. The alert of the layer is activated when the predetermined compressive load has been reached which signals that the preload of the fastener assembly has been reached.

20 Claims, 7 Drawing Sheets

FASTENING SYSTEM, A FASTENER ASSEMBLY, AND A METHOD OF PRELOADING THE FASTENER ASSEMBLY

BACKGROUND

Many components of an aircraft are fastened together via a fastener, such as a bolt or a screw, etc., at a joint. A torque wrench may be used to tighten a nut onto the bolt or the screw. The amount of tightening of the nut via the torque wrench is based on existing calculations of friction to tighten the nut. Generally, the torque wrench tightens the nut until a desired preload has been reached in the fastener. However, variations such as frictional variations in the threads of the fasteners may cause variations in the preload of the joint. Variations in the preload may cause fatigue in the fastener over its life.

SUMMARY

Therefore, it is desirable to develop a fastening system and a fastener assembly that improves repeatability of a preload, and other benefits are discussed herein.

The present disclosure provides a fastening system including a first component and a second component. The fastening system includes a fastener assembly configured to attach together the first component and the second component. The fastening system also includes a layer disposed between the fastener assembly and the first component and/or the second component. The layer is configured to provide an alert when a predetermined compressive load has been reached in the first component and the second component which signals that a preload of the fastener assembly has been reached.

The present disclosure also provides a method of preloading a fastener assembly. A fastener of the fastener assembly is inserted through a first component and a second component to attach together the first component and the second component. A layer is disposed between the fastener assembly and the first component and/or the second component. The layer is configured to provide an alert which signals that a preload of the fastener has been reached. Torque is applied to the fastener assembly until a predetermined compressive load has been reached in the first component and the second component which activates the alert.

The present disclosure further provides a fastener assembly for attaching together a first component and a second component. The fastener assembly includes a first fastener portion having a head, and a second fastener portion spaced apart from the head. The fastener assembly includes a layer disposed between the head and the first component and/or between the second fastener portion and the second component. The layer is configured to provide an alert when a predetermined compressive load has been reached in the first component and the second component which signals that a preload of the fastener assembly has been reached.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Moreover, terms such as "first," "second," "third," and so on, may be used to describe separate components. Such terminology may include the words specifically mentioned above, derivatives thereof, and words of similar import. Furthermore, the term "substantially" can refer to a slight imprecision or slight variance of a condition, quantity, value, or dimension, etc., some of which are within manufacturing variance or tolerance ranges.

As used herein, an element or step recited in the singular and preceded by the word "a" or "an" should be understood as not necessarily excluding the plural of the elements or steps. Further, any reference to "one configuration" is not intended to be interpreted as excluding the existence of additional configurations that also incorporate the recited features. Moreover, unless explicitly stated to the contrary, configurations "comprising" or "having" an element or a plurality of elements having a particular property may include additional elements not having that property. The phrase "at least one of" as used herein should be construed to include the non-exclusive logical "or", i.e., A and/or B and so on depending on the number of components.

Figure 1:
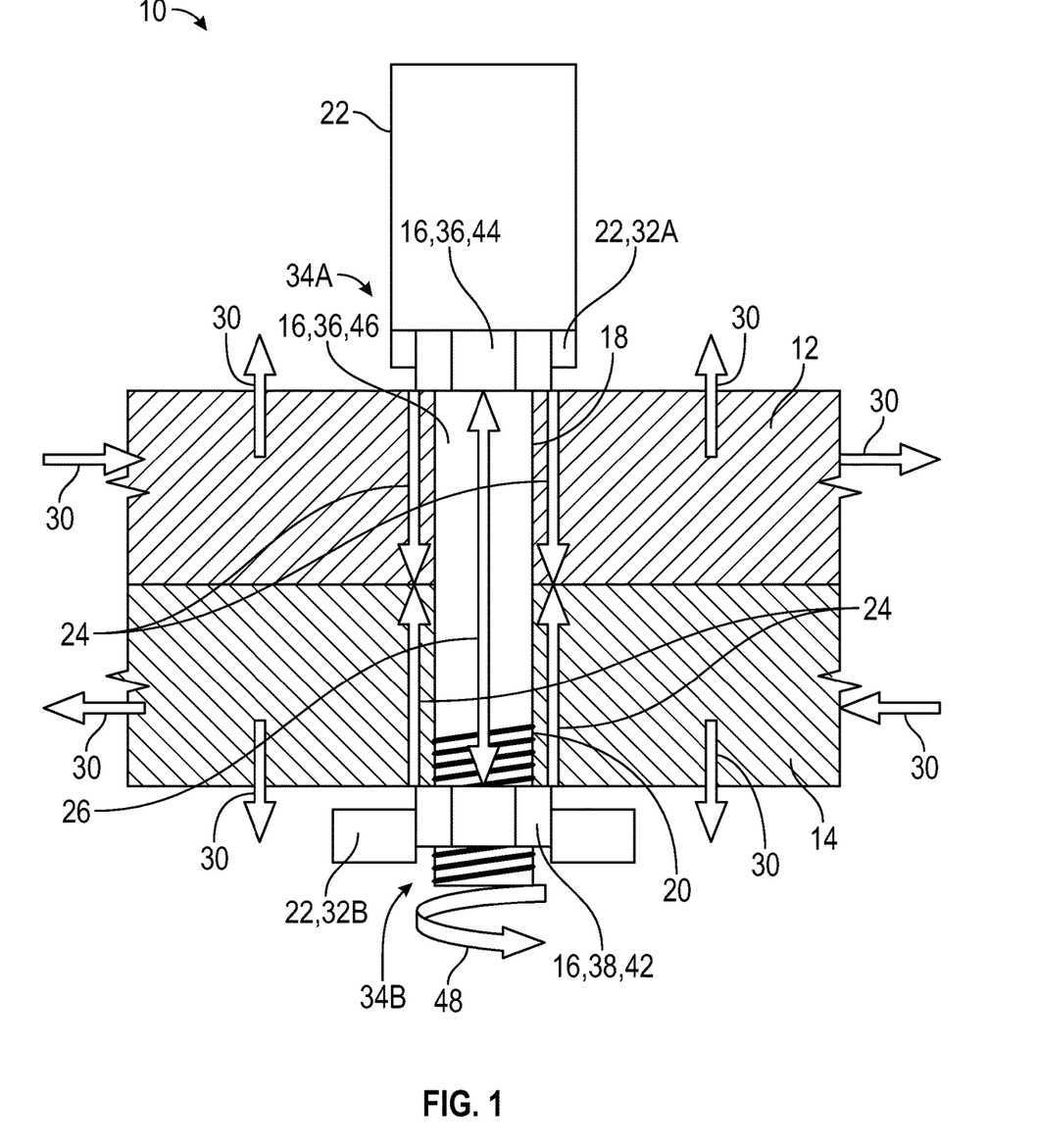
FIG. 1 is a schematic illustration of a fastening system with a layer removed.

Referring to the figures, wherein like numerals indicate like or corresponding parts throughout the several views, a fastening system 10 is generally shown in FIG. 1.

Continuing with FIG. 1, the fastening system 10 includes a first component 12 and a second component 14, which may be attached together. More specifically, a fastener assembly 16 is configured to attach together the first component 12 and the second component 14. In certain configurations, the first component 12 may define a first aperture 18 and the second component 14 may define a second aperture 20. Generally, the first aperture 18 and the second aperture 20 align with each other to receive the fastener assembly 16.

The first component 12 and the second component 14 may be any suitable configuration, and non-limiting examples of the components 12, 14 may include one or more of panels, such as inner panels, outer panels, skin panels, etc., frames, brackets, stringers, bulkheads, keels, ribs, doors, fittings, gear, or any other components 12, 14 that may be attached to each other, and combinations thereof. Therefore, the first component 12 and the second component 14 may be used in various applications, such as, but not limited to: flight vehicles, such as aircraft, drones, payloads, space shuttles, etc.; movable platforms, such as locomotives, automobiles, off-road vehicles, watercrafts, farm equipment, etc.; equipment, buildings, or any other applications where it is desirable to attach together components 12, 14.

Generally, a tool or implement 22 (shown in FIG. 1) is used to tighten the fastener assembly 16 to the first component 12 and the second component 14 to attach or clamp together the first component 12 and the second component 14 at a joint. More specifically, the fastener assembly 16 is tightened until a predetermined compressive load 24 is reached that is effective to clamp together the first component 12 and the second component 14 at the joint, which in turn causes a tension load 26 to be applied to the fastener assembly 16, which in turn establishes a preload on the fastener assembly 16. As the fastener assembly 16 tightens, the first component 12 and the second component 14 are squeezed together to create compression in the first component 12 and the second component 14, and correspondingly, create tension in the fastener assembly 16 as the preload. It is to be appreciated that more than two components 12, 14, i.e., any suitable number of components, may be clamped together at the joint. Generally, the preload is equal and opposite to the compressive load 24 in the first component 12, the second component 14 (plus any other number of components being used), and washer(s) 28 (numbered in FIGS. 4 and 5) if using washer(s) 28. The washer(s) 28 will be discussed further below.

The predetermined compressive load 24 may be a threshold based on the desired preload of the fastener assembly 16, which may be based on engineering requirements, government requirements, aircraft parameters, etc. The predetermined compressive load 24 will be referred to generally as the compressive load 24 in the below discussion.

For example, if the first component 12 and the second component 14 are loaded, external forces 30 are applied to the first component 12 and the second component 14 in various directions, some of which may be pulling apart the first component 12 and the second component 14. The fastener assembly 16 is designed to counter the external forces 30 and maintain the attachment or clamping between the first component 12 and the second component 14, and, in doing so, the fastener assembly 16 is repeatedly put under stress which may cause fatigue. Fatigue may be reduced or improved by preloading the fastener assembly 16, which may improve the structural life of the fastener assembly 16. Furthermore, preloading the fastener assembly 16, as described herein, may reduce alternating stress in the fastener assembly 16 under repeated loading.

In certain configurations, the tool 22 may include one or more segments 32A, 32B that cooperate to tighten the fastener assembly 16. Therefore, one of the segments 32A may engage one end 34A of the fastener assembly 16 and another one of the segments 32B may engage another end 34B of the fastener assembly 16 during tightening via the tool 22. In certain configurations, the tool or implement 22 is a wrench, optionally a torque wrench, a drill, an Allen key, a screw driver, a nut driver, a socket wrench, or any other suitable tool or implement 22 being able to tighten the fastener assembly 16 to the first component 12 and the second component 14.

Turning to example details of the fastener assembly 16, in certain configurations the fastener assembly 16 may include a first fastener portion 36 and a second fastener portion 38. As shown in FIGS. 1-5, in certain configurations, generally, the fastener assembly 16 may include a fastener 40 and a nut 42, in which the first fastener portion 36 may include the fastener 40, and the second fastener portion 38 may include the nut 42. More specifically, in certain configurations, the first fastener portion 36 may include a head 44 and the second fastener portion 38 includes the nut 42 spaced apart from the head 44. It is to be appreciated that the head 44 of the first fastener portion 36 may be external to the first component 12 or the second component 14 as illustrated in FIG. 1, or the head 44 of the first fastener portion 36 may be countersunk into the first component 12 or the second component 14.

Referring back to the tool 22, to tighten the fastener assembly 16, one of the segments 32A may engage the first fastener portion 36, such as the fastener 40 or the head 44, to prevent the first fastener portion 36 from moving while the other one of the segments 32B moves the second fastener portion 38, such as the nut 42, or, one of the segments 32A may engage the first fastener portion 36, such as the fastener 40 or the head 44, to move the first fastener portion 36 while the other one of the segments 32B prevents the second fastener portion 38, such as the nut 42, from moving. In yet another example, to tighten the fastener assembly 16, one of the segments 32A may engage the first fastener portion 36, such as the fastener 40 or the head 44, to move the first fastener portion 36 in a first direction while the other one of the segments 32B moves the second fastener portion 38, such as the nut 42, in another direction different from the first direction.

The fastener 40 may be disposed through the first aperture 18 and the second aperture 20 to attach together the first component 12 and the second component 14. More specifically, the head 44 may be attached to the fastener 40, and additionally, the fastener 40 may include a post 46 having the head 44 attached thereon, whereby the post 46 is disposed through the first aperture 18 and the second aperture 20. Generally, when the second fastener portion 38 is the nut 42, the fastener 40 and the nut 42 are threaded together to clamp together the first component 12 and the second component 14.

Turning to FIGS. 2-5, the head 44 of the fastener 40 has an outer head diameter $d_h$ greater than an outer post diameter $d_p$ of the post 46, and greater than a first hole diameter $d_1$ of the first aperture 18 of the first component 12. As such, referring to FIGS. 1-5, the head 44 may be attached to an end 34A of the fastener 40 to prevent the fastener 40 from passing through the first component 12 and the second component 14.

Continuing with FIGS. 1-5, the second fastener portion 38 also has an outer nut diameter $d_n$ greater than a second hole diameter $d_2$ of the second aperture 20 of the second component 14. The second fastener portion 38 may be attached to another end 34B of the fastener 40 to prevent the fastener 40 from passing through the first component 12 and the second component 14. Therefore, the head 44 and the second fastener portion 38 cooperate to prevent the fastener 40 from pulling through the apertures 18, 20 when the preload is applied to the fastener assembly 16.

Therefore, generally, the tool 22 may engage the head 44 and/or the nut 42 of the fastener assembly 16 to tighten the fastener 40 to the first component 12 and the second component 14. More specifically, one of the segments 32A of the tool 22 may engage the head 44 and another one of the segments 32B of the tool 22 may engage the nut 42. A tool force 48 may be applied to the fastener assembly 16 via the tool 22 until the compressive load 24 is reached, and thus, the preload is reached. In certain configurations, the tool force 48 may be a torque, and therefore, the post 46 of the fastener 40 and the nut 42 may be threaded to cooperate with each other. The fastener assembly 16 may be any suitable configuration, and non-limiting examples may include a bolt, a shoulder bolt, a jo-bolt, a stud, a screw, a hi-lok, a composi-lok, a rivet, a hex key, etc., which may cooperate with the nut 42, a collar, etc. In certain configurations, the head 44 of the fastener assembly 16 may be replaced via a nut 42, in which case, the fastener assembly 16 has nuts 42 at both ends 34A, 34B.

Referring to FIGS. 2-5, the fastening system 10 also includes a layer 50 disposed between the fastener assembly 16 and the first component 12 and/or the second component 14. That is, the layer 50 may be disposed between the fastener 40 and the first component 12 and/or the second component 14. Non-limiting examples of the layer 50 may include a material or a fluid that is painted, brushed, sprayed, adhered, dip-coated, deposited, vapor deposition, heat fusion, etc.

The layer 50 is configured to provide an alert when the compressive load 24 has been reached in the first component 12 and the second component 14. The alert serves as a signal that the preload of the fastener assembly 16 has been reached. In certain configurations, the tool force 48, such as the torque, is applied to the fastener assembly 16 until the alert is activated via the layer 50, which signals that the compressive load 24 has been reached in the first component 12 and the second component 14. Therefore, the alert is activated when the preload of the fastener 40 is reached which indicates to stop the tool force 48, such as torquing, on the fastener 40.

The fastening system 10 is designed to improve the accuracy and repeatability of obtaining the preload by using the layer 50 as the alert, and thus, reducing variability of the preload depending on the friction between the threaded engagement between the post 46 and the nut 42. In other words, even in light of manufacturing tolerances, the fastening system 10 described herein may obtain the desired preload via the layer 50. Therefore, using existing calculations based on friction with the torque wrench, as discussed above under the background section, does not need to be relied upon, and may be beneficially obviated.

The layer 50 may be disposed in any suitable location relative to the fastener assembly 16 and the components 12, 14 to provide the alert, and non-limiting examples are discussed below. It is to be appreciated that the layer 50 is not shown in FIG. 1 to illustrate other features of the fastening system 10, but the layer 50 may be disposed in FIG. 1 in any location as described herein.

As shown in FIGS. 2-5, generally, the layer 50 may be disposed between the head 44 and the second fastener portion 38. More specifically, the layer 50 may be disposed between the head 44 and the first component 12 and/or disposed between the second fastener portion 38 and the second component 14. As such, in certain configurations, the layer 50 may engage the fastener 40 and/or the nut 42. That is, the layer 50 may be disposed between the head 44 and the first component 12 and/or disposed between the second fastener portion 38, such as the nut 42, and the second component 14. Therefore, any suitable number of layers 50 may be used, and even though FIGS. 2-5 illustrate a plurality of layers 50, it is to be appreciated that one layer 50 may be utilized.

Figure 2:
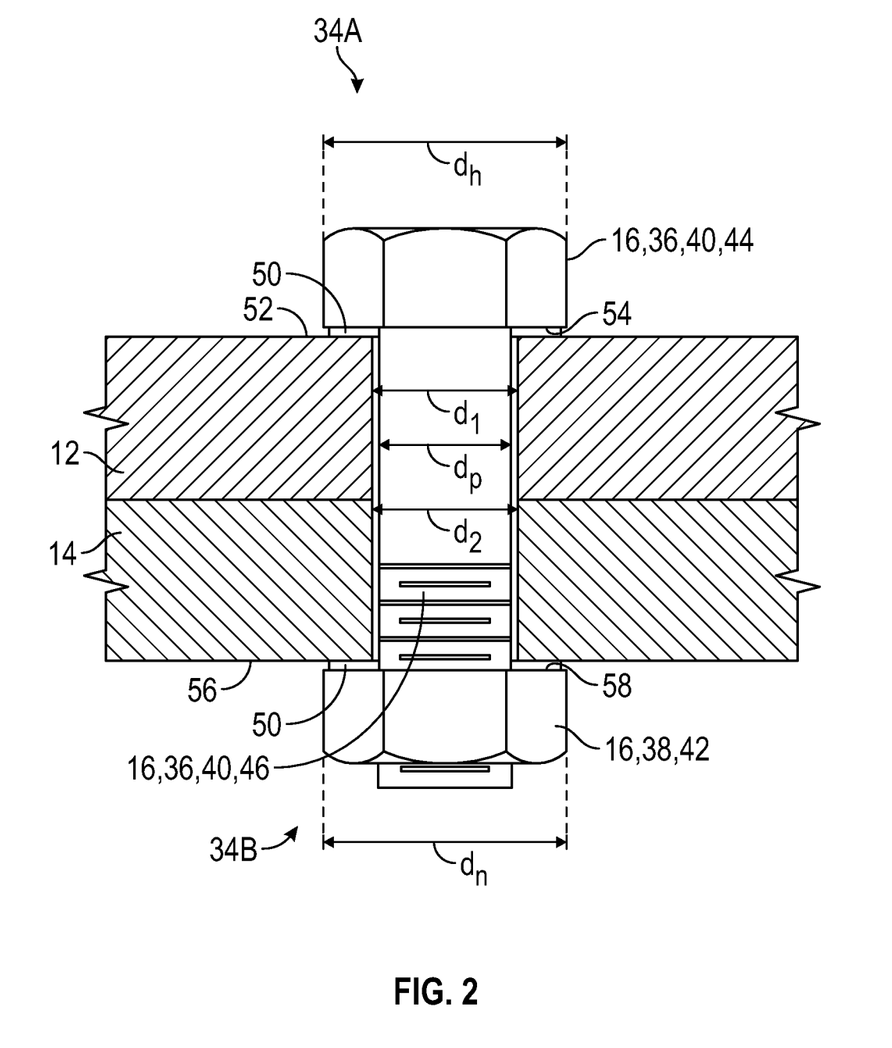
FIG. 2 is a schematic illustration of a fastener assembly clamping together a first component and a second component without using one or more washers, with example locations of the layer illustrated.
Figure 3:
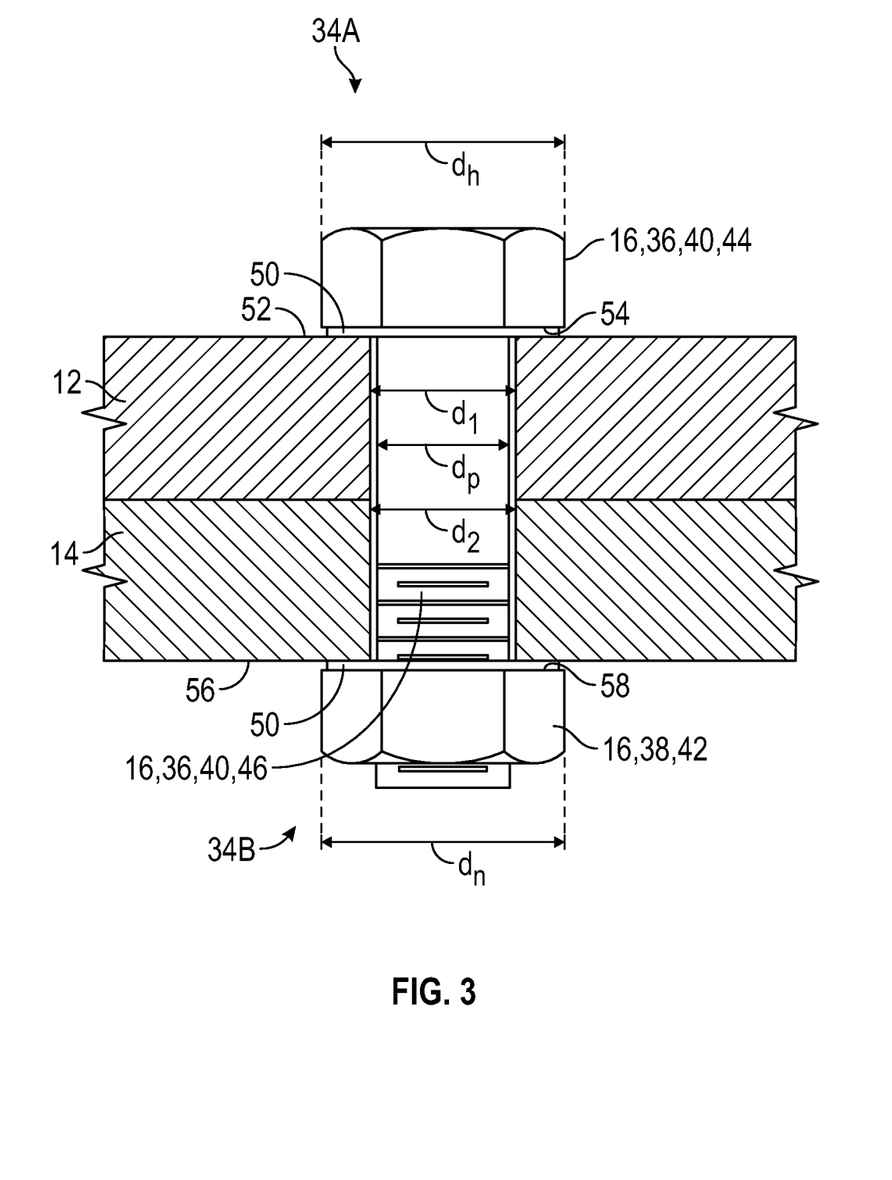
FIG. 3 is a schematic illustration of the fastener assembly clamping together the first component and the second component without using one or more washers, with additional example locations of the layer illustrated.
Figure 4:
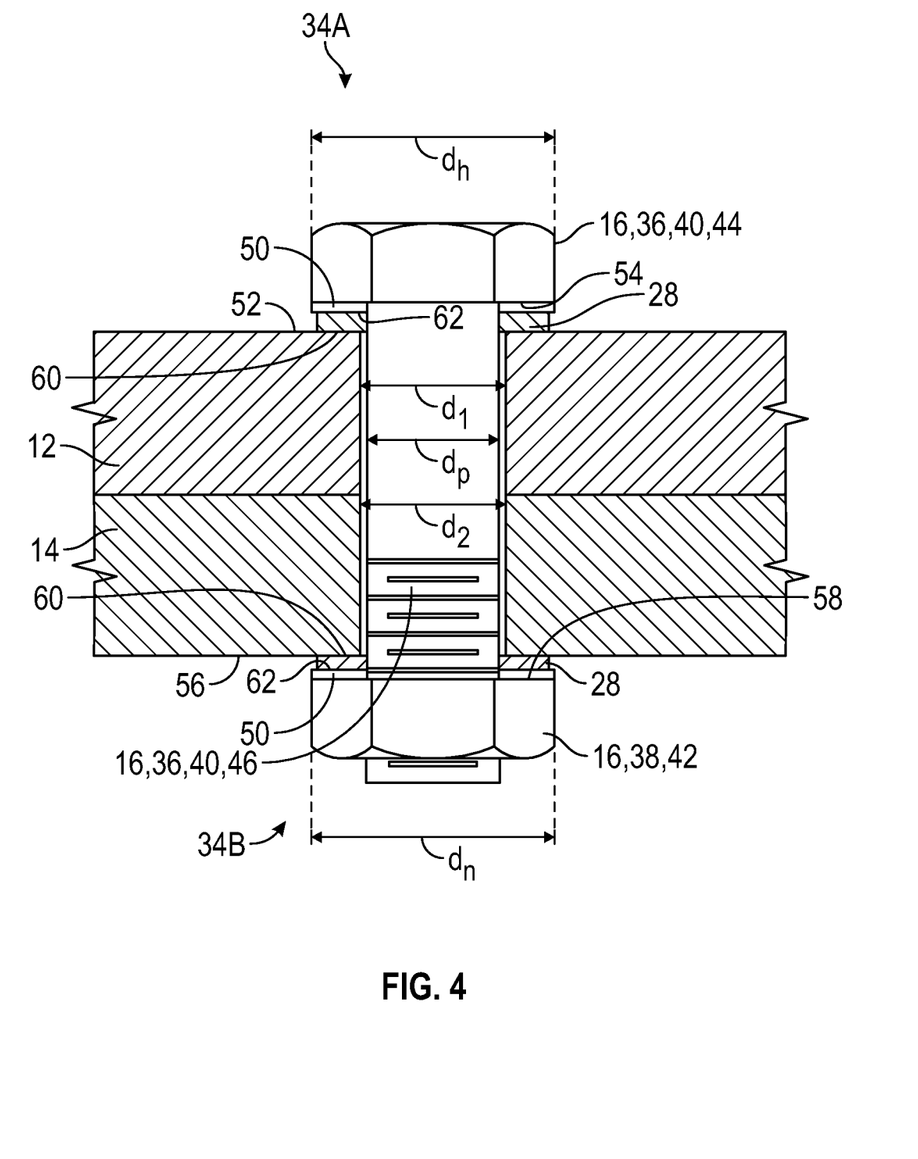
FIG. 4 is a schematic illustration of the fastener assembly clamping together the first component and the second component using one or more washers, with additional example locations of the layer illustrated relative to the one or more washers.
Figure 5:
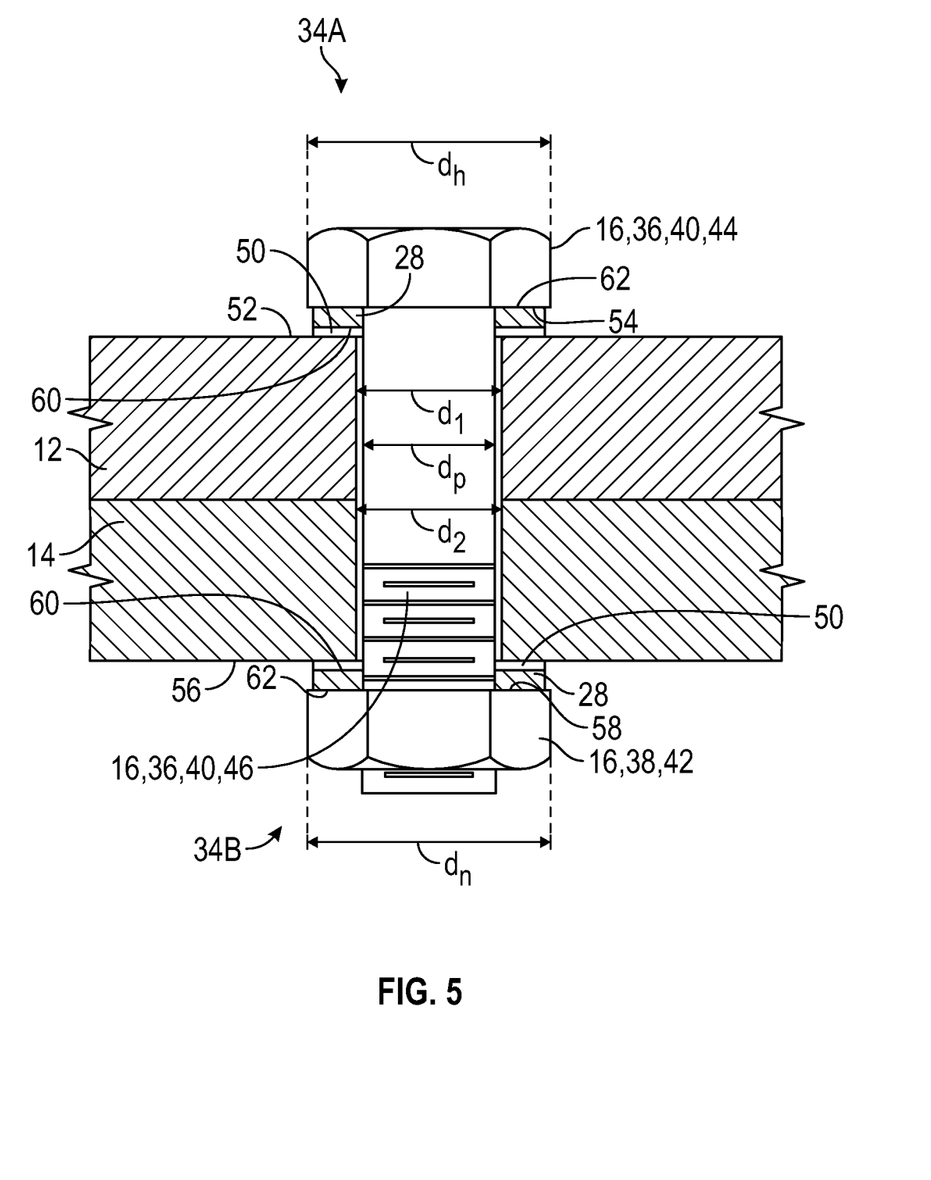
FIG. 5 is a schematic illustration of the fastener assembly clamping together the first component and the second component using one or more washers, with yet other example locations of the layer illustrated relative to the one or more washers.

Referring to FIGS. 2-4, generally, the layer 50 may engage the first fastener portion 36 and/or the second fastener portion 38. In these configurations, the layer 50 may be attached to the head 44 of the first fastener 40 component and/or the second fastener portion 38 such as the nut 42.

Turning to FIGS. 2 and 3, in these configurations, the layer 50 is attached to the head 44 and/or the first component 12, and/or the layer 50 is attached to the second fastener portion 38 and/or the second component 14. More specifically, the first component 12 may include a first face 52 that faces outwardly away from the second component 14 and the head 44 of the first fastener portion 36 may include a first surface 54 that faces toward the first component 12. Therefore, the first face 52 and the first surface 54 face each other. The layer 50 may be partially (see FIG. 2) or completely (see FIG. 3) disposed around the first surface 54 so as, respectively, to partially or completely surround the post 46 of the fastener 40. Similarly, the layer 50 may be partially (see FIG. 2) or completely disposed around the first face 52, so as, respectively, to partially or completely surround the first aperture 18 of the first component 12.

Continuing with FIGS. 2 and 3, the second component 14 may include a second face 56 that faces outwardly away from the first component 12 and the nut 42 of the second fastener portion 38 may include a second surface 58 that faces toward the second component 14. Therefore, the second face 56 and the second surface 58 face each other. The layer 50 may be partially (see FIG. 2) or completely (see FIG. 3) disposed around the second surface 58 so as, respectively, to partially or completely surround the post 46 of the fastener 40. Similarly, the layer 50 may be partially (see FIG. 2) or completely disposed around the second face 56 so as, respectively, to partially or completely surround the second aperture 20 of the second component 14.

Optionally, the fastener assembly 16 may include one or more washers 28 disposed between the head 44 of the fastener assembly 16 and the first component 12, and/or one or more washers 28 disposed between the second fastener portion 38 and the second component 14. For example, in certain configurations, if using one washer 28, the washer 28 may be disposed between the head 44 and the first component 12 or disposed between the second fastener portion 38 and the second component 14. As another example, if using two washers 28, a first washer 28 may be disposed between the head 44 and the first component 12, and a second washer 28 may be disposed between the second fastener portion 38 and the second component 14. As yet another example, if using two washers 28, both of the washers 28 may be disposed or stacked between the head 44 of the fastener assembly 16 and the first component 12, or both of the washers 28 may be disposed or stacked between the second fastener portion 38 and the second component 14. It is to be appreciated that any suitable number of the washers 28 may be disposed or stacked between the head 44 of the fastener assembly 16 and the first component 12, and/or disposed or stacked between the second fastener portion 38 and the second component 14.

Generally, the washers 28 include a first side surface 60 and a second side surface 62 opposing the first side surface 60. The first side surface 60 and the second side surface 62 of each of the washers 28 may be any suitable configuration, and non-limiting examples of the surfaces 60, 62 may include flat, arcuate, angled, tapered, chamfered, corrugated, etc. If the washer(s) 28 is/are disposed between the head 44 and the first component 12, the first side surface 60 of the corresponding washer 28 faces the first face 52 of the first component 12 and the second side surface 62 of that washer 28 faces the first surface 54 of the head 44. Similarly, if the washer(s) 28 is/are disposed between the nut 42 and the second component 14, the first side surface 60 of the corresponding washer 28 faces the second face 56 of the second component 14 and the second side surface 62 of that washer 28 faces the second surface 58 of the nut 42.

In certain configurations, the layer 50 may be disposed on a single washer 28, such as on the first side surface 60 and/or the second side surface 62. In other configurations, the layer 50 is disposed on the first washer 28, such as on the first side surface 60 and/or the second side surface 62 of the first washer 28, and, as well, on the second washer 28, such as on the first side surface 60 and/or the second side surface 62 of the second washer 28. It is to be appreciated that the layer 50 may be disposed on any suitable number of washers 28.

The layer 50 may be any suitable configuration to provide the alert. When the layer 50 is activated, the alert may be in the form of an observable feature or state that may be visually seen or perceived, may be in the form of a noise or sound that may be audibly heard or perceived, and/or may be in the form of an odor that may be smelled or perceived, and various ways to do so are discussed below. Optionally, the alert may be created by an exothermic reaction as discussed below.

In certain configurations, the layer 50 may be a coating. The coating may be applied to the fastener assembly 16 (including, for example, the head 44 and/or the nut 42), the first component 12, the second component 14, and/or one or more of the washers 28, if using the washers 28, and combinations thereof. The coating may be applied to the fastener assembly 16, the first component 12, the second component 14, and/or one or more of the washers 28 in any suitable way, and non-limiting examples may include a material or fluid that is painted, brushed, sprayed, adhered, dip-coated, deposited, vapor deposition, heat fusion, etc. If using the washers 28, optionally, the washers 28 may be dipped into the coating. In certain configurations, the coating may be a liquid fluid or gel, but it is to be appreciated that the coating may be any suitable configuration.

In certain configurations, the coating may include a first part 64 and a second part 66 that mix together to create the alert when the compressive load 24 has been reached. Therefore, the first part 64 and the second part 66 may react together via a chemical reaction to create the alert. For example, the first part 64 may be a product and the second part 66 may be a reactant. More specifically, the first part 64 may be an epoxy and the second part 66 may be a catalyst. In certain configurations, the first part 64 and/or the second part 66 may be a dye, or a paint pigment. It is to be appreciated that any suitable number of the parts 64, 66, i.e., more than two, may be mixed together to create the alert.

To prevent the first part 64 and the second part 66 from prematurely mixing, at least one of the parts 64, 66 are separated from each other until the compressive load 24 is reached which causes the parts 64, 66 to mix, as detailed further below. For example, the first part 64 and/or the second part 66 may be contained in a housing 68 (see FIGS. 6-8) to prevent mixing of the first part 64 and the second part 66 until the desired preload has been reached or to prevent expelling the dye or the paint pigment until the desired preload has been reached.

Alternatively, in certain configurations, mixing of the parts 64, 66 is not required. For example, regarding the configuration where the dye or the paint pigment is contained in the housing 68, when the housing 68 breaks, the dye or the paint pigment may be expelled out of the housing 68 to provide a visual alert. That is, mixing of the parts 64, 66 to cause a reaction to provide the visual alert is not required.

Figure 6:
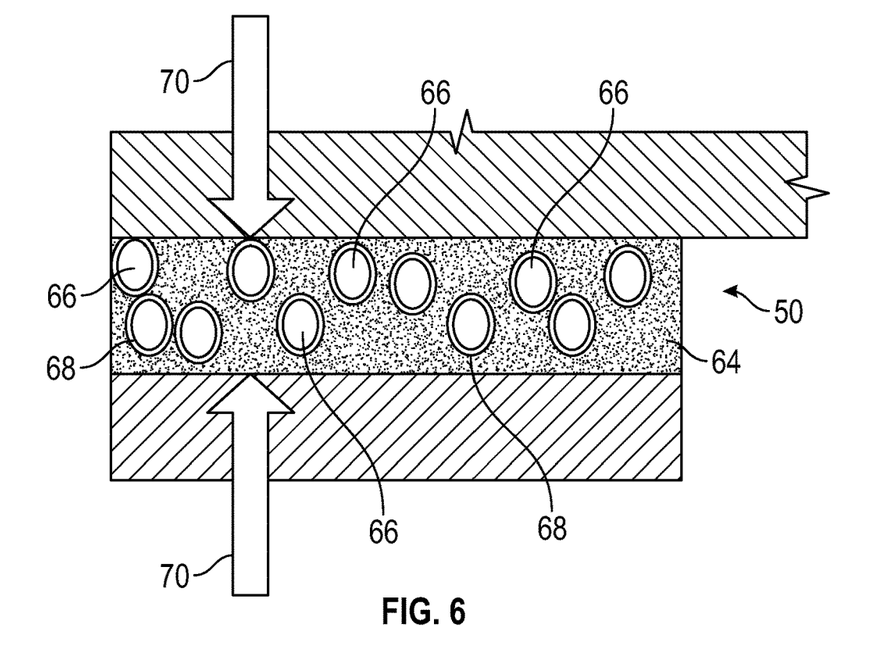
FIG. 6 is a schematic enlarged view of the layer when using a housing to separate a first part and a second part, with the first part outside of the housing.

In certain configurations, the second part 66 is contained in the housing 68 and the first part 64 is coated on the fastener assembly 16 (including, for example, the head 44 and/or the nut 42), the first component 12, the second component 14, and/or one or more of the washers 28 (see FIG. 6). In other configurations, the first part 64 is contained in the housing 68 and the second part 66 is coated on the fastener assembly 16 (including, for example, the head 44 and/or the nut 42), the first component 12, the second component 14, and/or one or more of the washers 28 (see FIG. 7). In yet other configurations, the first part 64 and the second part 66 are contained in separate housings 68 (see FIG. 8), and the coating outside of the housings 68 is used to attach the layer 50 to the fastener assembly 16 (including, for example, the head 44 and/or the nut 42), the first component 12, the second component 14, and/or one or more of the washers 28. The housing 68 is fractured or broken when a compressive load 24 has been reached which indicates, in turn, that the predetermined preload has been reached, sufficient to allow the first part 64 and/or the second part 66 to exit the housing 68 and mix with the other part so as to create the alert or expel from the housing 68 to create the alert. Expelling or mixing of the parts 64, 66 may create an audible alert, a scent or odor alert, and/or an exothermic alert, such as a visual alert and/or a temperature change alert.

In other configurations, the layer 50 may include an audible feature. As one example, the audible feature may include a fracturable material that fractures when the compressive load 24 has been reached to create a sound as the alert. Therefore, for example, the housing 68 discussed above may be used but in certain configurations does not contain the first part 64 and/or the second part 66. The housing 68 may be empty or may contain a material that crinkles, cracks, etc., so as to make an audible sound when compressed via the compressive load 24. Therefore, upon fracturing or breaking the housing 68, the sound, as an audible alert, occurs. Another example, the audible feature may include a conical or cupped washer, similar to a Belleville washer, instead of the housing 68, and the conical or cupped washer flattens when the compressive load 24 has been reached to make the sound as the alert. The breaking strength of the housing 68 is determined based on the preload of the fastener assembly 16.

In yet other configurations, the layer 50 may include a visual feature. As one example of the visual feature, the visual feature may include a coating that changes color to create the alert when the compressive load 24 has been reached. As another example, the visual feature may also be an exothermic reaction in which the housings 68 discussed above may be used to mix the first part 64 and the second part 66 together cause a reaction that may be visually seen as a spark or flash of light. Alternatively, the housing 68 may break to expose a color, such as the dye or the paint pigment discussed above, which does not require mixing between two or more parts 64, 66. Therefore, in certain configurations, each of the housings 68 may contain the same part, such as a first part 64 that contains the color. The breaking strength of the housing 68 is determined based on the preload of the fastener assembly 16. As one example, a fluorescent color may be exposed in which an ultraviolet light or goggles may be used to detect the fluorescent color as the visual feature. In other configurations, the visual feature may be a material upon being compressed creates a spark or flash of light as the alert when the compressive load 24 has been reached.

In other configurations, the layer 50 may include a temperature feature. The temperature feature may also be an exothermic reaction in which the housings 68 discussed above may be used to mix the first part 64 and the second part 66 together cause a reaction that may create a temperature change that may be physically detected or detected, e.g., via a thermal camera or an infrared camera. In other configurations, the temperature feature may be a material which, upon being compressed, creates or produces heat when the compressive load 24 has been reached. Therefore, the housings 68 in the figures may be replaced via the material of the temperature feature and will not be further illustrated.

In yet other configurations, the layer 50 may include a scent or smell feature. As one example of the scent or smell feature, the housing 68 may break to release a scent or smell which does not require mixing between two or more parts 64, 66 as the scent or smell feature. Therefore, in certain configurations, each of the housings 68 may contain the same part, such as a first part 64 that contains the scent or smell. The breaking strength of the housing 68 is determined based on the preload of the fastener assembly 16. As another example of the scent or smell feature, the layer 50 may contain one or more materials that frictionally engage or rub against each other to activate the scent or smell when the compressive load 24 has been reached.

Figure 7:
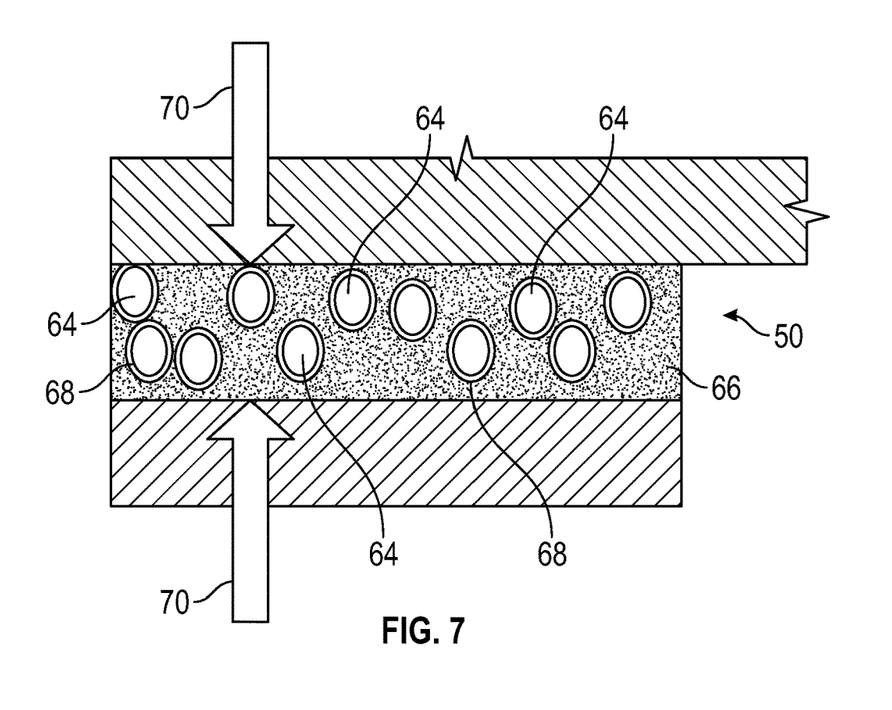
FIG. 7 is a schematic enlarged view of the layer when using the housing to separate the first part and the second part, with the second part outside of the housing.
Figure 8:
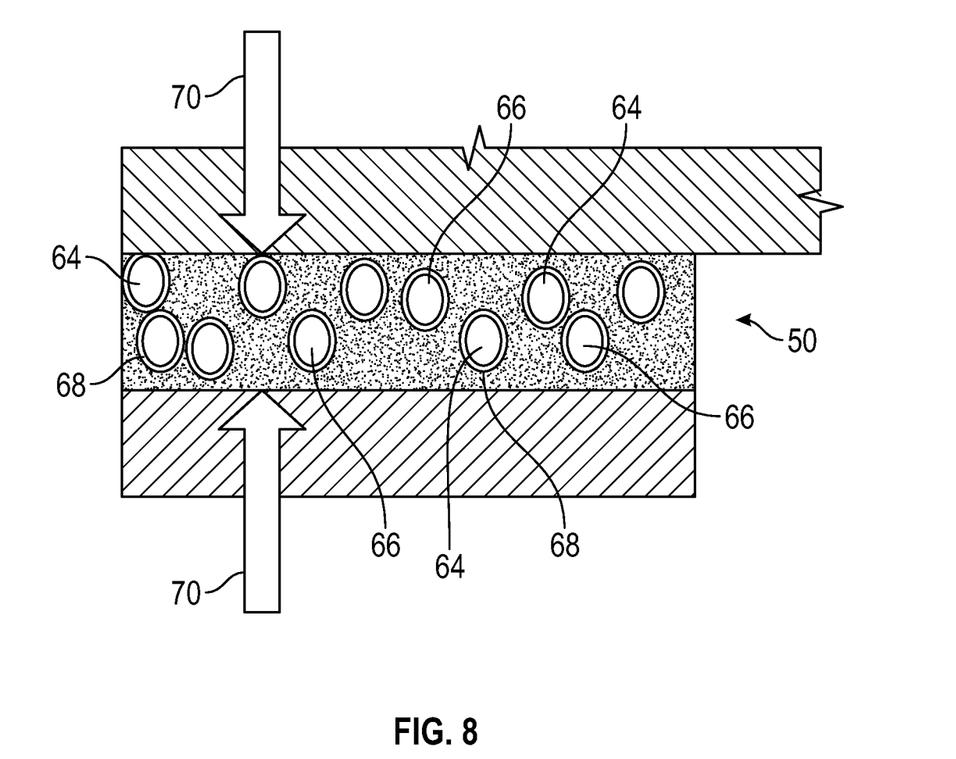
FIG. 8 is a schematic enlarged view of the layer when using the housing to separate the first part and the second part, with the first part and the second part disposed in different ones of the housing.

It is to be appreciated that all of the figures may be representative of the different configurations of the layer 50, and therefore, FIGS. 6-8 should not exclude examples related to the scent or smell feature, the visual feature, the temperature feature, and the audible feature.

The present disclosure also provides a method of preloading the fastener assembly 16. Generally, the layer(s) 50 is applied to the desired location before attaching together the first component 12 and the second component 14.

The fastener 40 of the fastener assembly 16 is inserted through the first component 12 and the second component 14 to attach together the first component 12 and the second component 14. The layer 50 is applied to the desired location before inserting the fastener 40 through the first component 12 and the second component 14. Generally, as mentioned above, the layer 50 is configured to provide the alert which signals that the preload of the fastener 40 has been reached.

The tool 22 is used to tighten the fastener assembly 16 against the first component 12 and the second component 14 to compress the first component 12 and the second component 14 together until the predetermined compressive load 24 has been reached at the joint. During this process, the tool force 48 is applied to the fastener assembly 16 until the compressive load 24 is reached. In certain configurations, the torque is applied to the fastener assembly 16 until the compressive load 24 has been reached in the first component 12 and the second component 14 which activates the alert. A force 70 is applied to the layer 50 as the tool force 48, such as torque, is applied to the fastener assembly 16 via operation of the tool 22. The force 70 may be a compression force as the first component 12 and the second component 14 are clamped together via the compressive load 24. The alert of the layer 50 is activated when the compressive load 24 has been reached, which signals that the preload of the fastener assembly 16 has been reached.

As discussed above, in certain configurations, the layer 50 may include the coating, the audible feature, the visual feature, the temperature feature, and/or the scent or smell feature, which may provide the alert as discussed above and will not be repeated.

When the alert is activated, the tool force 48, such as the torque, is removed from the fastener assembly 16. Then, another fastener assembly 16 may be disposed through the first aperture 18 of the first component 12 and the second aperture 20 of the second component 14 at a different location along the joint and preloaded as described herein, which may be repeated for the desired number of fastener assemblies 16 used to clamp together the first component 12 and the second component 14 along the joint.

It is to be appreciated that the order or sequence of performing the method(s) as discussed above is for illustrative purposes and other orders or sequences are within the scope of the present teachings. It is to also be appreciated that the method(s) may include other features not specifically identified in the method discussion immediately above.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the configurations described herein are intended to provide a general understanding of the structure of the various configurations. The illustrations are not intended to serve as a complete description of all of the elements and features of apparatus and systems that utilize the structures or methods described herein. Many other configurations may be apparent to those of skill in the art upon reviewing the disclosure. Other configurations may be utilized and derived from the disclosure, such that structural and logical substitutions and changes may be made without departing from the scope of the disclosure. Accordingly, the disclosure and the figures are to be regarded as illustrative rather than restrictive.

The following Clauses provide some example configurations of the fastening system 10, the fastener assembly 16, and the method as disclosed herein.

Clause 1: A fastening system comprising: a first component; a second component; a fastener assembly configured to attach together the first component and the second component; a layer disposed between the fastener assembly and the first component and/or the second component; and wherein the layer is configured to provide an alert when a predetermined compressive load has been reached in the first component and the second component which signals that a preload of the fastener assembly has been reached.

Clause 2: The system as set forth in clause 1 wherein the fastener assembly includes a first fastener portion and a second fastener portion, wherein the layer engages the first fastener portion and/or the second fastener portion.

Clause 3: The system as set forth in clause 2 wherein the first fastener portion includes a head, wherein the layer is attached to the head and/or the second fastener portion.

Clause 4: The system as set forth in clauses 2 or 3 wherein the second fastener portion includes a nut spaced apart from the head, wherein the layer is attached to the head and/or the nut.

Clause 5: The system as set forth in any one of the preceding clauses wherein the fastener assembly includes a first fastener portion having a head, and the fastener assembly includes a second fastener portion spaced apart from the head, wherein the layer is disposed between the head and the first component and/or between the second fastener portion and the second component.

Clause 6: The system as set forth in clause 5 wherein the fastener assembly includes a first washer disposed between the head and the first component or disposed between the second fastener portion and the second component, wherein the layer is disposed on the first washer.

Clause 7: The system as set forth in clause 6 wherein the fastener assembly includes a second washer, wherein the first washer is disposed between the head and the first component, and the second washer is disposed between the second fastener portion and the second component, wherein the layer is disposed on the first washer and the second washer.

Clause 8: The system as set forth in any one of the preceding clauses wherein the layer is a coating.

Clause 9: The system as set forth in clause 8 wherein the coating includes a first part and a second part that mix together to create the alert when the predetermined compressive load has been reached.

Clause 10: The system as set forth in clause 9 wherein the first part is a product and the second part is a reactant.

Clause 11: The system as set forth in any one of clauses 1-7 wherein the layer includes an audible feature.

Clause 12: The system as set forth in clause 11 wherein the audible feature includes a fracturable material that fractures when the predetermined compressive load has been reached to create a sound as the alert.

Clause 13: The system as set forth in any one of clauses 1-7 wherein the layer includes a visual feature.

Clause 14: The system as set forth in clause 13 wherein the visual feature includes a coating that changes color to create the alert when the predetermined compressive load has been reached.

Clause 15: The system as set forth in any one of the preceding clauses wherein the fastener assembly includes a fastener and a nut, wherein the layer engages the fastener and/or the nut, wherein the fastener and the nut are threaded together to clamp together the first component and the second component, wherein torque is applied to the fastener assembly until the alert is activated via the layer, which signals that the predetermined compressive load has been reached in the first component and the second component.

Clause 16: A method of preloading a fastener assembly, the method comprising: inserting a fastener of the fastener assembly through a first component and a second component to attach together the first component and the second component, wherein a layer is disposed between the fastener assembly and the first component and/or the second component, wherein the layer is configured to provide an alert which signals that a preload of the fastener has been reached; and applying torque to the fastener assembly until a predetermined compressive load has been reached in the first component and the second component which activates the alert.

Clause 17: The method as set forth in clause 16 further comprising removing the torque from the fastener assembly when the alert is activated.

Clause 18: The method as set forth in clauses 16 or 17 further comprising applying a force to the layer as the torque is applied to the fastener assembly.

Clause 19: The method as set forth in one of clauses 16-18 wherein the layer is a coating.

Clause 20: A fastener assembly for attaching together a first component and a second component, the fastener assembly comprising: a first fastener portion having a head; a second fastener portion spaced apart from the head; a layer disposed between the head and the first component and/or between the second fastener portion and the second component; and wherein the layer is configured to provide an alert when a predetermined compressive load has been reached in the first component and the second component which signals that a preload of the fastener assembly has been reached.

What is claimed is:
1. A fastening system comprising:
a first component;
a second component;
a fastener assembly configured to attach together the first component and the second component;
a layer intermediate between a surface of the fastener assembly and the first component and/or the second component; and
wherein the layer is configured to provide an alert when a predetermined compressive load has been reached in the first component and the second component which signals that a preload of the fastener assembly has been reached;
wherein the fastener assembly includes a first fastener portion having a head and a second fastener portion having a nut;
wherein the surface includes a first surface disposed on the head and the surface includes a second surface disposed on the nut; and the layer covers the first surface of the head and/or covers the second surface of the nut.

2. The system as set forth in claim 1 wherein the first fastener portion includes a head, wherein the layer is attached to the head and/or the second fastener portion.

3. The system as set forth in claim 2 wherein the second fastener portion includes a nut spaced apart from the head, wherein the layer is attached to the head and/or the nut.

4. The system as set forth in claim 1 wherein the fastener assembly includes a first fastener portion having a head, and the fastener assembly includes a second fastener portion spaced apart from the head, wherein the layer is disposed between the head and the first component and/or between the second fastener portion and the second component.

5. The system as set forth in claim 4 wherein the fastener assembly includes a first washer disposed between the head and the first component or disposed between the second fastener portion and the second component, wherein the surface includes a first side surface and/or a second side surface of the first washer, and the layer remains on the first side surface and/or the second side surface of the first washer to provide the alert.

6. The system as set forth in claim 5 wherein the fastener assembly includes a second washer, wherein the surface includes a first side surface and/or a second side surface of the second washer, and wherein the first washer is disposed between the head and the first component, and the second washer is disposed between the second fastener portion and the second component, wherein the layer is disposed on the first side surface and/or the second side surface of the first washer, and the layer is disposed on the first side surface and/or the second side surface of second washer.

7. The system as set forth in claim 1 wherein the layer is a coating.

8. A fastening system comprising:
a first component;
a second component;
a fastener assembly configured to attach together the first component and the second component;
a layer disposed between the fastener assembly and the first component and/or the second component; and
wherein the layer is configured to provide an alert when a predetermined compressive load has been reached in the first component and the second component which signals that a preload of the fastener assembly has been reached; wherein the layer is a coating including a first part and a second part that mix together to create the alert when the predetermined compressive load has been reached.

9. The system as set forth in claim 8 wherein the first part is a product and the second part is a reactant.

10. The system as set forth in claim 1 wherein the layer includes an audible feature.

11. A fastening system comprising:
a first component;
a second component;
a fastener assembly configured to attach together the first component and the second component;
a layer disposed between the fastener assembly and the first component and/or the second component;
wherein the layer is configured to provide an alert when a predetermined compressive load has been reached in the first component and the second component which signals that a preload of the fastener assembly has been reached; and wherein the layer includes an audible feature of a fracturable material that fractures when the predetermined compressive load has been reached to create a sound as the alert.

12. The system as set forth in claim 1 wherein the layer includes a visual feature.

13. The system as set forth in claim 12 wherein the visual feature includes a coating that changes color to create the alert when the predetermined compressive load has been reached.

14. The system as set forth in claim 1 wherein the fastener assembly includes a fastener and a nut, wherein the layer engages the fastener and/or the nut, wherein the fastener and the nut are threaded together to clamp together the first component and the second component, wherein torque is applied to the fastener assembly until the alert is activated via the layer, which signals that the predetermined compressive load has been reached in the first component and the second component.

15. A method of preloading a fastener assembly, the method comprising:
inserting a fastener of the fastener assembly through a first component and a second component to attach together the first component and the second component, wherein a layer covers a surface of the fastener assembly such that the layer is intermediate between the fastener assembly and the first component and/or the second component, wherein the layer is configured to provide an alert which signals that a preload of the fastener has been reached;
applying torque to the fastener assembly until a predetermined compressive load has been reached in the first component and the second component which activates the alert; and
wherein the surface of the fastener assembly includes a first surface of the fastener and/or a second surface of a nut of the fastener assembly, and wherein the layer is a coating that covers the first surface of the fastener and/or covers the second surface of the nut.

16. The method as set forth in claim 15 further comprising removing the torque from the fastener assembly when the alert is activated.

17. The method as set forth in claim 15 further comprising applying a force to the layer as the torque is applied to the fastener assembly.

18. The system as set forth in claim 1 wherein:
the first fastener portion includes the first surface that faces toward the first component; and
the layer is a coating that covers the first surface such that the layer is intermediate between the first surface and the first component.

19. The method of claim 15, wherein the layer includes a visual feature.

20. The method of claim 15, wherein the layer includes a visual feature that comprises a coating that changes color to create the alert when the predetermined compressive load has been reached.

* * * * *